US006553507B1

(12) United States Patent
Cohen

(10) Patent No.: US 6,553,507 B1
(45) Date of Patent: *Apr. 22, 2003

(54) JUST-IN-TIME SOFTWARE UPDATES

(75) Inventor: Paul M. Cohen, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,622

(22) Filed: Sep. 30, 1998

(51) Int. Cl.[7] .................................................. G06F 11/30
(52) U.S. Cl. ........................................... 714/4; 717/173
(58) Field of Search ................................ 714/4–15, 43, 714/49, 26, 38, 46; 707/202, 203, 204; 717/171, 172, 173

(56) References Cited

U.S. PATENT DOCUMENTS

| | | | | | |
|---|---|---|---|---|---|
| 5,155,847 A | * | 10/1992 | Kirouac et al. | ............ | 395/600 |
| 5,845,077 A | * | 12/1998 | Fawcett | ................. | 395/200.51 |
| 5,960,170 A | * | 9/1999 | Chen et al. | .................. | 713/200 |
| 6,006,016 A | * | 12/1999 | Faigon et al. | .......... | 395/185.01 |
| 6,012,152 A | * | 1/2000 | Douik et al. | ................... | 714/26 |
| 6,029,258 A | * | 2/2000 | Ahmad | ........................ | 714/46 |
| 6,049,671 A | * | 4/2000 | Slivka et al. | ................ | 395/712 |
| 6,205,579 B1 | * | 3/2001 | Southgate | ................... | 707/203 |
| 6,263,457 B1 | * | 7/2001 | Anderson et al. | ............. | 714/26 |

* cited by examiner

Primary Examiner—Scott Baderman
(74) Attorney, Agent, or Firm—Blakely, Sokoloff, Taylor & Zafman LLP

(57) ABSTRACT

A method for updating a software program having the steps of detecting a fault in the software program during execution and updating a predetermined portion of the software program with a new portion identified in a fault database. The software program resides in a first node and the fault database resides in a second node. The first and the second node are coupled to each other through the Internet. The new portion is configured to solve the fault and is downloadable through the Internet.

10 Claims, 3 Drawing Sheets

FAULT DATABASE  116

| Application 300 | Fault Address 302 | Patch 304 | Comment 306 |
|---|---|---|---|
| Word 97 | 0:30940903 | ftp:\\ftp.vendor.com\patch\word1.zip | Fixes fault in word while doing grammer checking.... |
| Word 95 | 0:22029200 | ftp:\\ftp.vendor.com\patch\word9.zip | Fixes fault in word while pasting Excell sheets... |
| ... | ... | ... | ... |
| Money 98 | 123:45678999 | ftp:\\ftp.vendor.com\patch\xyzdll.zip | Fixed fault when Money used on system with FirstAid 98 |

*Figure 3*

JUST-IN-TIME SOFTWARE UPDATES

BACKGROUND OF THE INVENTION (1) Field of the Invention

The present invention is related to the field of software updates, more specifically, the method and apparatus of the present invention is just-in-time software updates.

(2) Description of Related Art

Currently available software programs can typically be purchased through retail stores. With the advent of the Internet, downloading software programs on-line for purchase has become quite popular.

Most providers of software programs introduce new versions of their software programs on a periodic basis. When a new version of a software program is introduced, a user may replace their existing software program with the new version. Any problems experienced with an older version of the software program may be potentially remedied by the new version of the same software program. However, remedying such a problem may only be done when the actual new version of the software program is made available. Additionally, downloading a new version of a software program may lead to new problems inherent in the new version, since the old version is entirely replaced by the new.

Thus, troubleshooting by downloading a new version of a software program is not specific to a particular problem and does not allow for an immediate remedy.

It is therefore desirable to have a method and apparatus that provides a solution to a problem encountered by a user using a particular software program that is made available at the time the problem is detected and the solution is specific to the problem detected.

BRIEF SUMMARY OF THE INVENTION

A method for updating a software program having the steps of detecting a fault in the software program during execution and updating a predetermined portion of the software program with a new portion identified in a fault database. The software program resides in a first node and the fault database resides in a second node. The first and the second node are coupled to each other through the Internet. The new portion is configured to solve the fault and is downloadable through the Internet.

BRIEF DESCRIPTION OF THE DRAWINGS

FIG. 3 illustrates an exemplary fault database.

DETAILED DESCRIPTION OF THE INVENTION

The present invention is a just-in-time software update mechanism which provides software updates to a software program only when a problem is detected in the software program and the software update provided is specific to that known fault or problem. The present invention obviates the need for a user to have to wait for a new version of a software program to become available in order to solve a problem with an existing version of the software program.

Figure 1:
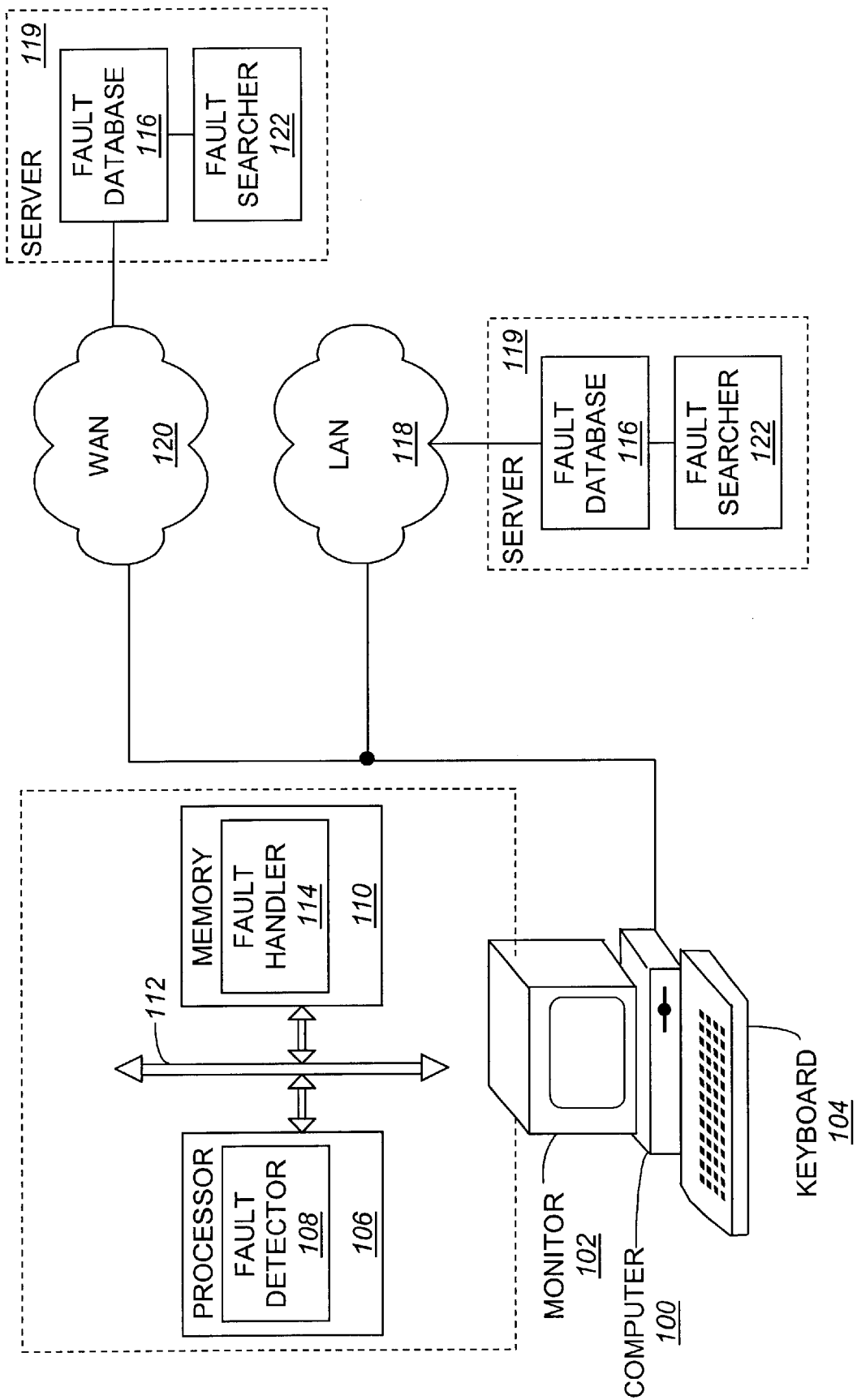
FIG. 1 illustrates an exemplary block diagram with an implementation of the present invention.

FIG. 1 illustrates an exemplary block diagram with an implementation of the present invention. Computer 100 coupled to a display device 102, such as a monitor and an input device 104, such as a keyboard, has a processor 106 with a fault detector 108. The fault detector 108 is configured to detect faults during execution of a software program running on the computer 100. Currently available exemplary fault detectors include a general protection (GP) fault detector, a stack fault detector, an overflow fault detector and bounds fault detector, and are well-known in the art.

The processor 106 is coupled to a memory 110 via bus or busses 112. The memory 110 has a fault handler 114 configured to suspend fault processing upon the fault detector 108 detecting a fault and accessing a server to retrieve a possible solution for the fault. Although the embodiment of FIG. 1 illustrates a single fault handler 114, it can be appreciated by a person skilled in the art given the detailed description provided herein that one or more fault handlers may be provided for each fault to be handled.

The server accessed may be a server 119 accessible through a local area network (LAN) 118 or a wide area network (WAN) 120. The server 119 has a fault database 116 configured to hold troubleshooting information including but not limited to an identification of a software program, corresponding fault addresses identifying the faults, a solution in the form of a patch which modifies a portion of the software program and comments regarding the solution.

In one embodiment, the server 119 may have a fault searcher 122, which is configured to search the fault database 116 for the fault detected by the fault detector 108. Once the fault is identified and found in the fault database 116, the server 119 returns a corresponding solution from the fault database 116 if such is available.

In one embodiment of the present invention, the solution is made available through the fault database 116 in the form of a patch to a file transfer protocol (FTP) server with an FTP address designated by the patch. An FTP allows users to copy files from one Internet-connected computer to another.

If no solution is available, then the server 119 returns a report to the computer 100 indicating that there is no solution available.

Figure 2:
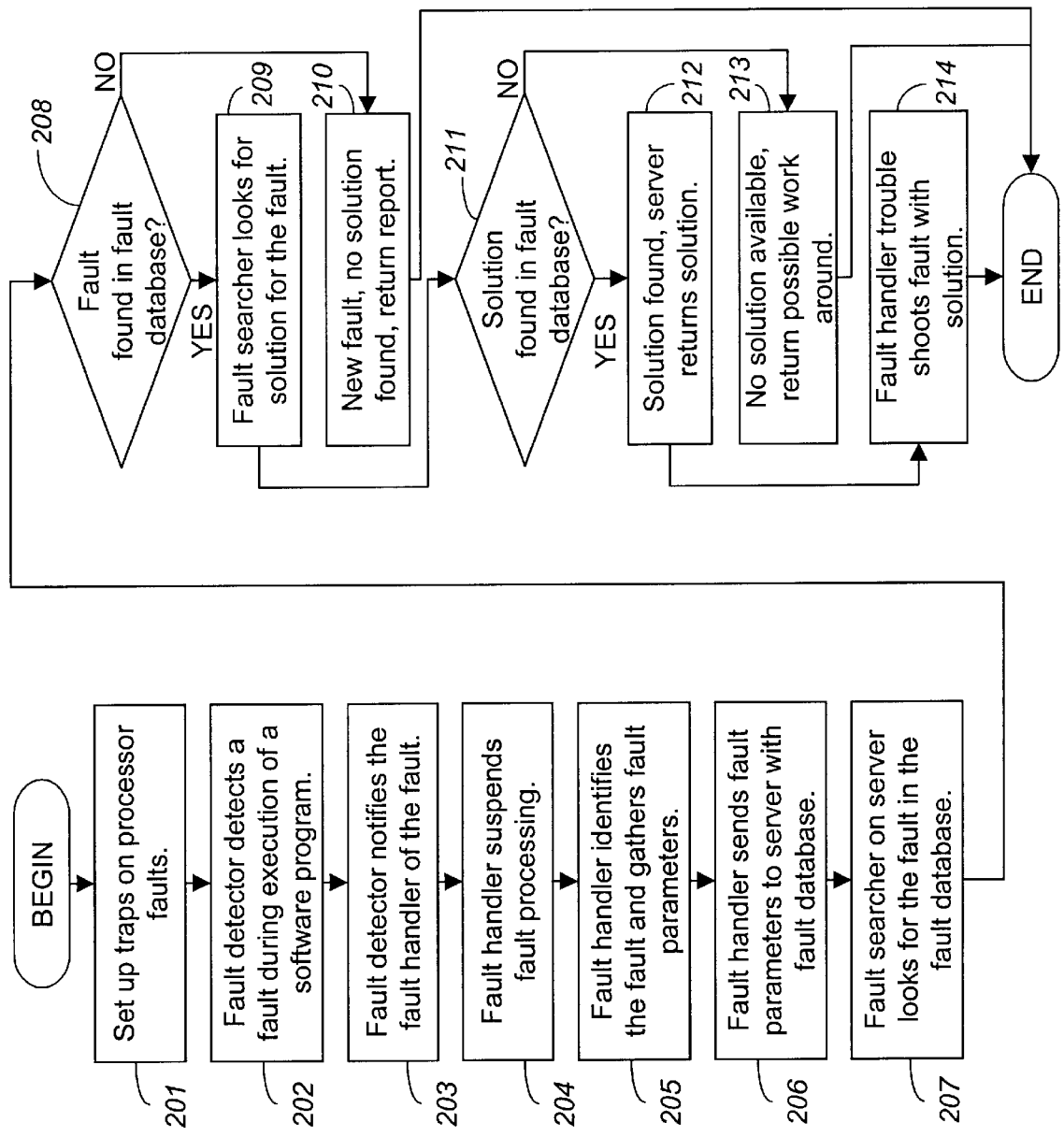
FIG. 2 is a flow diagram illustrating the general steps followed by one embodiment of the present invention.

FIG. 2 is a flow diagram illustrating the general steps followed by one embodiment of the present invention. In step 201, a fault handler 114 sets up traps on the processor faults. In step 202, the fault detector 108 detects a fault during execution of a software program. In step 203, a fault detector 108 then notifies the fault handler 114 of the particular fault detected. In step 204, in response to the fault notification by the fault detector 108, the fault handler 114 suspends all fault processing.

In step 205, the fault handler 114 identifies the fault, and gathers fault parameters, such as fault address, register values, and stack state, from the central processing unit (CPU) registers. The method of gathering fault parameters from CPU registers is well known in the art and needs no further discussion.

In step 206, the fault handler 114 forwards fault parameters to the server 119. In step 207, a fault searcher 122 on the server 119 looks for the faults in the fault database 116. In step 208, if the fault is found in the fault database, then in step 209, the fault searcher 122 looks for a corresponding solution for the fault in the fault database 116. Otherwise, in step 210, the fault is not found in the fault database 116. The fault is a new fault and the server 119 returns a report to the computer 100 indicating that the fault is a new fault.

In step 211, if the fault is found in the fault database 116, and if a solution is found in the fault database in step 211, the server 119 returns the solution found. Otherwise, if the solution is not found, then in step 213, server 119 returns a possible work around to computer 100. In one embodiment, the present invention deletes the faulting application from a program if feasible and forwards error parameters to the appropriate software vendor. In step 214, the fault handler 114 receives either the solution for the fault or a report indicating that no fault and/or solution was found. If a solution was found, the fault handler 114 troubleshoots using the solution.

FIG. 3 illustrates an exemplary fault database 116. The application identification column 300 identifies the software program with the fault. The fault address column 302 indicates the address of the instruction within the application where the fault was initiated or triggered. The patch column 304 indicates the file transfer protocol (FTP) address where a solution program or update is found. The comment column 306 indicates what the solution available will do to solve the fault that was found.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. An apparatus for updating a software program residing on a first node comprising:
    a fault database residing on a second node and configured to hold a plurality of entries each having a set of fault parameters and an associated software patch;
    a fault detector to monitor for a fault and detect the fault in said software program during execution of said software program, said software program residing in said first node;
    a fault handler residing on said first node and coupled to said fault database through the Internet, said fault handler to identify the fault, gather fault parameters, and send the fault parameters to said fault database; and
    a fault searcher at said second node to search said fault database and match the fault parameters with the associated software patch;
    wherein said fault handler is configured to automatically update a predetermined portion of the software program with a new portion, said new portion including the associated software patch identified in said fault database which is configured to solve the fault and is downloadable through the Internet.

2. The apparatus of claim 1 wherein said fault searcher is further configured to return a report indicating that the fault parameters describe a new fault if an entry matching the fault parameters is not found in said fault database.

3. The apparatus of claim 1 wherein said fault searcher is further configured to return a report indicating that a solution to the fault is not found if an entry matching the fault parameters is found but no corresponding software patch is found in said fault database.

4. A system for updating a software program, said system comprising:
    a first node comprising,
        a fault detector to monitor for a fault and detect the fault in said software program during execution of said software program, said software program residing in said first node;
        a storage element, said storage element configured to hold,
        a fault handler to identify the fault, gather fault parameters, and send the fault parameters to a fault database; and
        a processor configured to execute said fault handler; and
    a second node coupled to said first node through the Internet, said second node comprising,
        a server configured to hold said fault database, said fault database configured to hold a plurality of entries each having a set of fault parameters and an associated software patch; and
        a fault searcher to search said fault database and match the fault parameters with the associated software patch;
    wherein said fault handler is configured to automatically update a predetermined portion of the software program with a new portion, said new portion including said associated software patch identified in the fault database which is configured to solve the fault and is downloadable through the Internet.

5. The system of claim 4 wherein said fault searcher is further configured to return a report indicating that the fault parameters describe a new fault if an entry matching the fault parameters is not found in said fault database.

6. The system of claim 5 wherein said fault searcher is further configured to return a report indicating that a solution to the fault is not found if an entry matching the fault parameters is found but no corresponding solution is found in said fault database.

7. A system for updating a software program, including code configured for storage on a plurality of computer-readable apparatus, each computer readable apparatus coupled to each other through a network, said code executable by a computer, the code including a plurality of modules each configured to carry out at least one function to be executed by the computer, the system comprising:
    a first computer including:
        a fault detector configured to monitor for a fault and detect the fault in the software program during execution of said software program, said software program residing in said first computer; and
        a fault handler module to identify the fault, gather fault parameters, and send the fault parameters to a fault database;
    a second computer including:
        said fault database to hold a plurality of entries each having a set of fault parameters and an associated software patch;
        a fault searcher to search said fault database and match the fault parameters with the associated software patch;
    wherein said fault handler is configured to automatically update a predetermined portion of the software program with a new portion, said new portion including the associated software patch identified in said fault database which is configured to solve the fault and is downloadable through the Internet.

8. The system of claim 7 wherein said second computer is configured to return a report indicating that the fault parameters describe a new fault if an entry matching the fault parameters is not found in said fault database.

9. The system of claim 8 wherein said second computer is further configured to return a report indicating that a solution to the fault is not found if an entry matching the fault parameters is found but no corresponding solution is found in said fault database.

10. The system of claim 9 wherein said second computer is further configured to return a solution to the fault if an entry matching the fault parameters is found and a corresponding solution is found in said fault database.

* * * * *